June 30, 1964  J. WINN  3,139,074
INTERNAL COMBUSTION ENGINE
Filed March 2, 1961  3 Sheets-Sheet 1
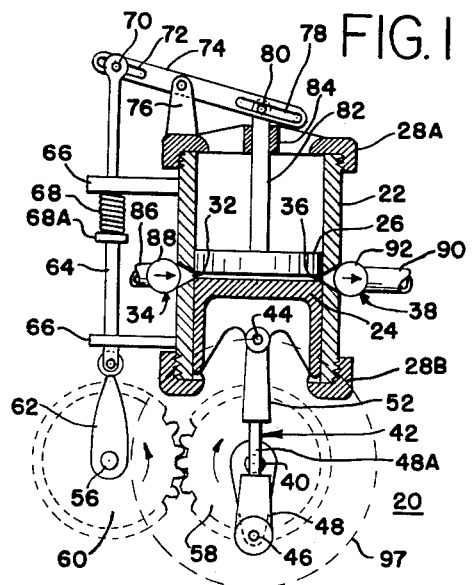
FIG. 1
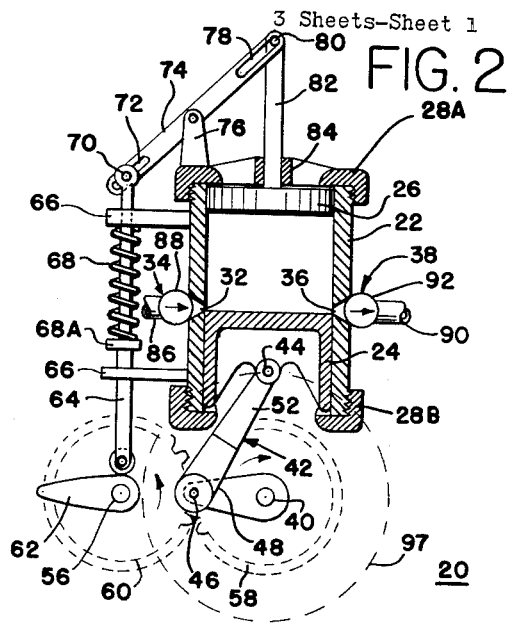
FIG. 2
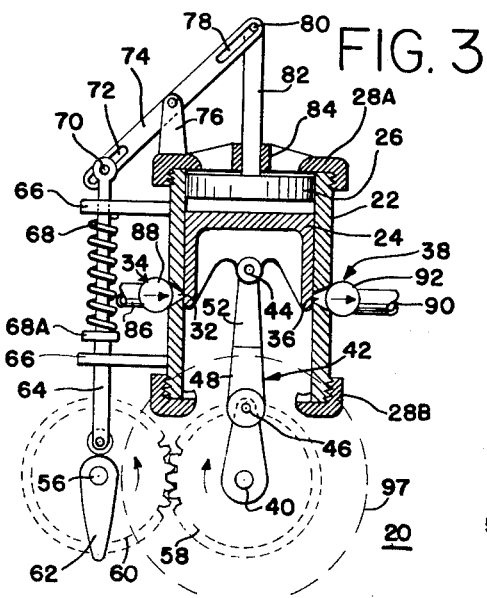
FIG. 3
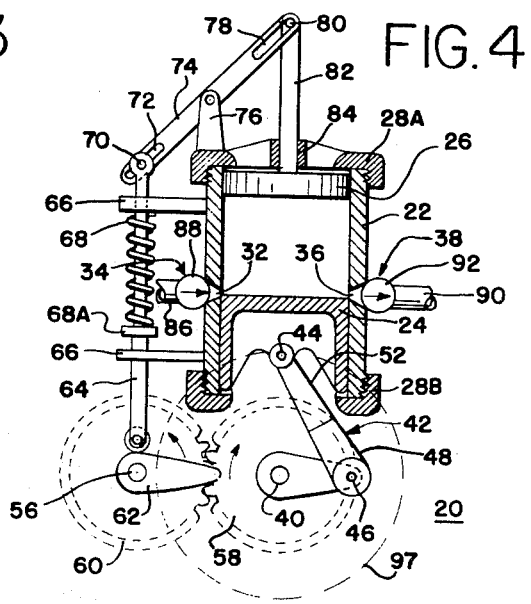
FIG. 4
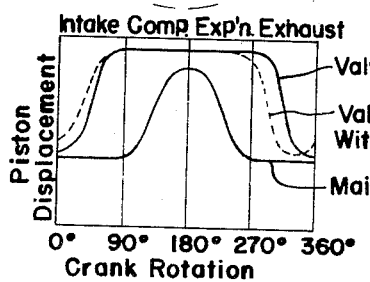
FIG. 5
*INVENTOR.*
JOHN WINN
BY 
ATTORNEYS

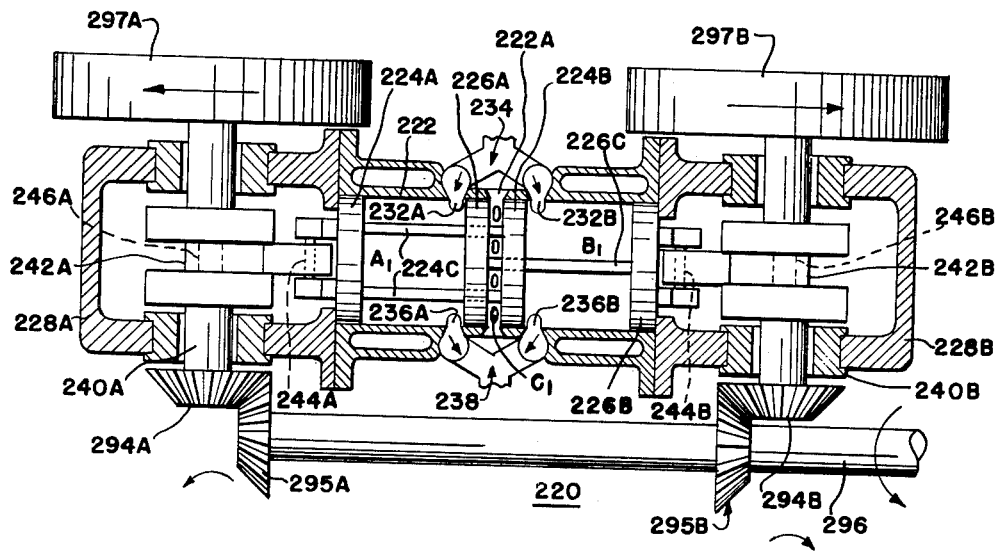
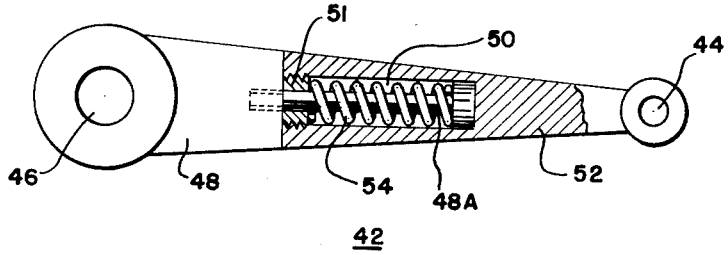

June 30, 1964

J. WINN 3,139,074

INTERNAL COMBUSTION ENGINE

Filed March 2, 1961

*INVENTOR.*
JOHN WINN
BY Mason, Kolehmainen,
Rathburn & Wyss

ATTORNEYS

United States Patent Office

3,139,074
Patented June 30, 1964

3,139,074
INTERNAL COMBUSTION ENGINE
John Winn, 4423 Sheridan Road, Chicago 40, Ill.
Filed Mar. 2, 1961, Ser. No. 92,835
15 Claims. (Cl. 123—51)

This invention relates to an improved internal combustion engine and more particularly to a piston-type internal combustion engine.

Present day piston-type internal combustion engines are generally classified in a variety of ways. One of the most common classifications is on the basis of whether the engine operates on a four-stroke cycle or a two-stroke cycle. Another common classification is based on whether an engine is of the spark-ignition type, the compression-ignition type, or a combination of both. Various other classifications and subclassifications are made concerning such things as combustion chamber design, valve systems, exhausting systems, intake systems, cylinder and piston arrangement, intake and fuel systems, ignition systems, and cooling systems, to name some of the more important.

In the general classification relating to the number of strokes in the operating cycle of an engine, all types of internal combustion engines generally operate in a cycle composed of four basic phases. The first phase of the cycle is usually called the intake or induction phase, the second is called the compression phase, the third is called the power or expansion phase, and the fourth is called the exhaust or expulsion phase. These phases sometimes overlap each other or are combined with one another in a variety of different ways; but each of the four phases is necessary in one form or another for an internal combustion engine to operate effectively.

The internal combustion engine known as the four-stroke cycle engine, commonly called a four-cycle engine, requires four piston strokes and two crankshaft revolutions to complete a cycle, one piston stroke usually being allocated to each of the phases in the cycle. The two-stroke cycle engine, commonly called a two-cycle engine, requires only two piston strokes and one crankshaft revolution to complete an operating cycle. Generally, the intake and compression phases are combined in one piston stroke, and the power and exhaust phases are combined in a second piston stroke, with some overlapping occurring between the phases.

Comparing a two-cycle engine with a four-cycle engine, the basic advantage of the two-cycle type is that it provides a power impulse "during" every revolution of the crankshaft. This results in a smoother, more continuous power flow from the piston to the crankshaft and, in addition, provides the advantage that an engine of given displacement will produce almost twice the power as a four-cycle engine of similar displacement. Consequently, where size, weight and cost are important factors, the two-cycle engine has enjoyed widespread use. Another advantage of the two-cycle engine over the four-cycle counterpart is that two-cycle engines are generally of the valveless design and utilize intake and exhaust ports in the cylinder walls and simple rotary or reed-type crankcase inlet valves in contrast with the relatively complicated valves and valve operating systems employed in four-cycle engines. This reduces the comparative cost of a two-cycle engine and substantially eliminates many problems prevalent in four-cycle type engines, such as valve overheating and burning, maintenance, and lubrication of cams, lifters, rocker arms, timing gears and tappets.

However, a two-cycle engine has some distinct disadvantages when compared with a four-cycle engine. The lack of a positively controlled valve system and the relatively short time allotted to the intake and exhaust phases of the cycle results in two-cycle engines being less reliable and harder to start than their four-cycle counterpart. Also, because of the relatively short time available for the intake and exhaust phases of the cycle in a two-cycle engine, both the exhaust and intake ports are often open at the same time for a period of the cycle. This results in several undesirable features, one being that the intake mixture is used to help purge the cylinder of exhaust products with the result that some of the intake mixture escapes through the exhaust port without being utilized. This causes a high specific fuel consumption and low volumetric efficiency. Also, it is impossible to keep at least some of the intake charge from mixing with the exhaust products, and this dilutes the intake charge with a consequential loss in the efficiency of combustion.

Because crankcase compression is generally used in two-cycle engines, it is necessary to add a lubricant to the fuel in order to lubricate the engine adequately. This results in a less combustible mixture with the consequent hard starting and loss in efficiency. Also, with this type of lubrication and the use of crankcase compression, high pumping and frictional losses are prevalent so that a two-cycle engine generally has a lower mechanical efficiency than the four-cycle counterpart.

Therefore, it is an object of this invention to provide an improved piston-type internal combustion engine having the advantageous features of both two-cycle and four-cycle type engines and eliminating many of the disadvantages of both types.

Another object of this invention is to provide an improved piston-type internal combustion engine that has a very high power output per unit engine weight and size.

Another object of this invention is to provide an improved piston-type internal combustion engine that provides a power impulse every crankshaft revolution but still has a relatively low specific fuel consumption.

Another object of this invention is to provide an improved piston-type internal combustion engine that has a relatively high volumetric efficiency and a relatively small amount of dilution of the intake charge by the exhaust products.

In accordance with the present invention, the foregoing and other objects are realized by providing an interal combustion engine having a cylinder with a pair of pistons movably mounted therein. The pistons are each operatively interconnected with the crankshaft to permit the pistons successively to remain stationary relative to the cylinder.

According to one aspect of the invention, inlet and outlet means communicate with the cylinder between the pistons to supply an intake charge to the cylinder during an intake phase and to exhaust the cylinder during an exhaust phase. Rotation of the crankshaft is effective to move one of the pistons in one direction to accomplish a compression phase and the crankshaft is rotated by the movement of that piston in the opposite direction during the power phase. Means are provided to maintain the other piston stationary during the compression and power phases. Moreover, the other piston is movable in the one direction to draw in an intake charge into the cylinder during an intake phase and movable in the opposite direction to exhaust the products of combustion from the cylinder engine during an exhaust phase, the first piston remaining stationary during the exhaust and intake phases.

Many other objects and advantages of the present invention will become apparent from considering the following description in conjunction with the drawings in which:

FIG. 1 is a simplified sectional view of an internal combustion engine which embodies the present invention and which illustrates the engine in a bottom dead-center position at the beginning of the intake phase of the cycle;

FIG. 2 is a sectional view of the engine of FIG. 1 showing the crank assembly in a position after 90° of clockwise rotation from the bottom dead-center position at the beginning of the compression phase of the cycle;

FIG. 3 is a sectional view of the engine of FIG. 1 showing the crank assembly in the top dead-center position at the beginning of the power phase of the cycle;

FIG. 4 is a sectional view of the engine of FIG. 1 showing the crank assembly in a position after 90° of clockwise rotation from the top dead-center position at the beginning of the exhaust phase of the cycle;

FIG. 5 is a graphical representation showing the movement of pistons in the engine of FIG. 1 in relation to rotation of the crank assembly;

FIG. 6 is an enlarged sectional view of an extensible connecting rod embodied in the invention;

FIG. 12 is a top sectional view of still another embodiment of an internal combustion engine embodying the features of the present invention.

Figure 7:
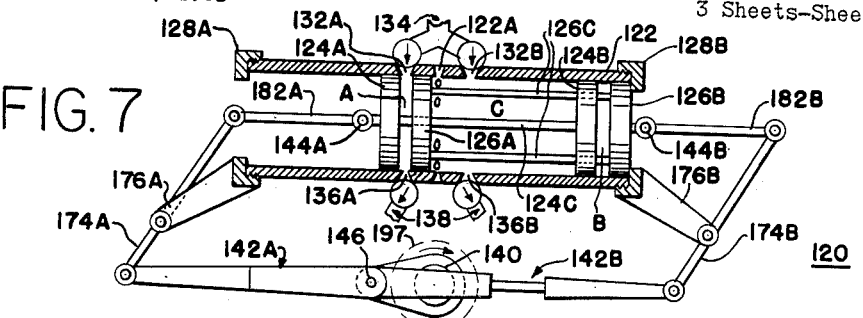
FIG. 7 is a simplified sectional view of another embodiment of an internal combustion engine embodying the features of the present invention with the crankshaft in a left dead-center position.

Referring now to FIG. 1 of the drawings, an internal combustion engine 20 embodying the present invention includes a cylinder 22 having a main piston 24 and a valve piston 26 movably mounted therein. The cylinder 22 is provided with removable end stops 28A and 28B at both ends for limiting the outward travel of the pistons 24 and 26. An intake port 32 in the wall of the cylinder 22 communicates with an intake system 34 in order to supply a fresh charge to the cylinder 22. An exhaust port 36 in the wall of the cylinder 22 communicates with an exhaust system 38 in order to allow the exhaust products to be expelled from the cylinder 22. The bottom edges of the ports 32 and 36 are positioned adjacent the face of the main piston 24 when this piston is at its outer extremity of travel resting in contact with the end stop 28B. It is preferable that the ports 32 and 36 be positioned diametrically opposite each other in the wall of the cylinder 22. However, they can be disposed at various positions around the wall of the cylinder 22 for convenience or necessity in order to eliminate interference with other engine parts.

A crankshaft 40 is rotatably mounted at one end of the cylinder 22 adjacent the main piston 24. An extensible connecting rod 42, having one end pivotally connected to a wrist pin 44 of the main piston 24 and the other end pivotally connected to a crank pin 46 of the crankshaft 40, interconnects the main piston 24 and the crankshaft 40. An enlarged view of the extensible connecting rod 42 is shown in FIG. 6. The connecting rod 42 includes a male member 48 which is secured to the crank pin 46 at one end and which includes a headed tubular portion or rod 48A that is slidably received in a recess 50 formed in a female member 52 secured to the wrist pin 44. A spring 54, which is positioned within the recess 50 between the headed portion of the rod 48A and an annular retaining ring 51 threadedly engaged in the recess 50, continually biases the members 48 and 52 toward each other.

A rotatably mounted cam shaft 56 positioned adjacent the crankshaft 40 is connected thereto by means of a pair of gears 58 and 60. The gears 58 and 60 include equal numbers of teeth and are mounted on the crankshaft 40 and cam shaft 56, respectively. A cam 62 mounted on the cam shaft 56 engages one end of reciprocable follower rod 64 that is positioned in parallel relationship with the longitudinal axis of the cylinder 22. The outer surface of the cam 62 engages a roller carried on the lower end of the follower rod 64 to cause the rod 64 to rise during one quarter revolution of the cam shaft 56, to fall during the next quarter revolution, and to remain at rest during the remaining half revolution.

The follower rod 64 is slidably mounted in a plurality of rod guides 66 mounted on the cylinder 22 and is continually biased toward the cam 62 by a spring 68 that is interposed between one of the guides 66 and a plate 68A secured to the rod 64. The upper end of the follower rod 64 is provided with a pin 70 that is received within a slot 72 defined near one end of a rocker arm 74. The rocker arm 74 is pivotally supported by a bracket 76 fastened to the end stop 28A. The other end of the rocker arm 74 is provided with a slot 78 in which is received a pin 80 secured to the upper end of a piston rod 82. The piston rod 82 is attached to the valve piston 26. A piston rod guide 84 is provided in the end stop 28 to slidably receive the piston rod 82.

The crankshaft 40 and the cam shaft 56 are supported by suitable bearings positioned in a crankcase housing (not shown). A spark plug and/or fuel injector (not shown) are provided in order to initiate combustion within the cylinder 22, and a flywheel 97 is proivded on the crankshaft 40. The intake system 34 is comprised of an intake manifold 86 and a pressure operated check valve 88. The check valve 88 allows a flow of a fuel charge from the intake manifold 86 into the cylinder 22 but prevents a reverse flow. The exhaust system 38 includes an exhaust manifold 90 and a pressure operated check valve 92. The check valve 92 allows a flow of exhaust gases from the cylinder 22 into the exhaust manifold 90 but prevents a reverse flow.

FIGS. 1–4 of the drawings illustrate the engine 20 in its different successive positions during a cycle of operation. In FIG. 1, the engine 20 is shown at the completion of the exhaust phase and the beginning of the intake phase of the cycle. The valve piston 26 occupies its innermost position in the cylinder 22 and the main piston 24 is at its outermost position resting on end stop 28B. There is very little clearance between the adjacent faces of the pistons 24 and 26 at this time, and the volume within the cylinder 22 bounded by the faces of the pistons 24 and 26 is very small. As the inertia of the flywheel 97 rotates the crankshaft 40 from the bottom dead-center position of FIG. 1 to the position depicted in FIG. 2, the main piston 24 remains stationary and the spring 54 causes the extensible connecting rod 42 to contract to its minimum length. During this time, the cam 62 allows the spring 68 to cause the follower rod 64 to move downwardly. This moves the valve piston 26 to its outermost position in the cylinder 22 against the end stop 28A and draws a fresh charge into the cylinder 22 through the intake port 32 from the intake system 34. The exhaust check valve 92 prevents exhaust products from flowing back into the cylinder 22 from the exhaust manifold 90 during this itme. Thus, there is only a very small amount of exhaust dilution of the intake charge.

As the inertia of the flywheel 97 carries the crankshaft 40 from the position of FIG. 2 to the top dead-center position shown in FIG. 3, the main piston 24 moves inwardly to its inner position and compresses the charge in the cylinder 22 between the faces of the pistons 24 and 26. The stroke of the main piston 24 is somewhat less than the stroke of the valve piston 26 depending on the desired compression ratio. Thus, the clearance volume of the engine 20 is not dependent on the compression ratio as in present engines. During the inward stroke of the main piston 24, the valve piston 26 remains stationary at its outermost position against the end stop 28A as the cam 62 allows the follower rod 64 to remain at rest. The ignition process is initiated by a spark plug or a fuel injector somewhat before the crankshaft 40 reaches the top dead-center position as is customary in internal combustion engines.

The crankshaft 40 is rotated from the top dead-center position of FIG. 3 to the position of FIG. 4 by the combustion pressure in the cylinder 22 which forces the main piston 24 outwardly or downwardly to impart rotational movement to the crankshaft 40 through the contracted connecting rod 42. As the main piston 24 approaches the end of its downward movements, the exhaust port 36 is uncovered, and part of the exhaust products flow out of the cylinder 22 into the exhaust manifold 90 through the valve 92. The intake check valve 88 prevents any flow of these exhaust products into the intake manifold 86. During this outward stroke of the main piston 24, the valve piston 26 remains stationary in its outermost position against the end stop 28A as the cam allows the follower rod 64 to remain at rest.

The outward travel of the main piston 24 is limited by the end stop 28B when the crankshaft 40 reaches the position of FIG. 4, and the inertia imparted to the flywheel on the outward stroke of the main piston 24 rotates the crankshaft 40 to the bottom dead-center position of FIG. 1 while the main piston 24 remains at rest against the end stop 28. During this portion of the cycle of the engine 20, the extensible connecting rod 42 is extended to its maximum length against the action of the spring 54, and the cam 62 moves the follower rod 64 upwardly against the force of the spring 68 to move the valve piston 26 inward to its innermost position in the cylinder 22. During this movement, the piston 26 expels the remaining exhaust products through the exhaust port 36 and the valve 92.

Referring now to FIG. 5 and the foregoing description, it can be seen that the main piston 24 remains stationary in its outermost position during the one-half revolution of the crankshaft 40 comprising the intake and exhaust phases of the cycle, moves inward to its innermost position during the compression phase, and moves outward to its outermost position during the expansion or power phase of the cycle. The valve piston 26 remains stationary in its outermost position during the one-half revolution of the crankshaft 40 comprising the compression and power phases of the cycle, moves inward to its innermost position during the exhaust phase, and outward to its outermost position during the intake phase. Thus, the pistons 24 and 26 never move at the same time, and can have different stroke lengths with the result that a very high volumetric efficiency can be obtained because it is not limited by the compression ratio of the engine 20. It should be understood here that the surface of cam 62 can be modified in order that the exhausting downward movement of the piston 26 can be made to commence as soon as the piston 24 passes the exhaust port 36 thus expediting the exhaust phase of the cycle and the upward intake stroke of the piston 26 could be started sooner thus allowing a greater time interval for the intake charge to flow into the cylinder 22, resulting in a higher power output from the engine at high speeds. The dashed line of FIG. 5 shows the movement of the piston 26 when the surface of cam 62 is changed as described above. Since the four phases of the operating cycle are performed by two pistons instead of one, it is possible to obtain a power stroke during each crank revolution and still allow substantially equal time for each phase of the cycle. This results in a greater power output for an engine of a given size. The reduced exhaust product dilution of the intake charge makes it possible to obtain a lower specific fuel consumption in the engine. Further, the engine 20 does not have valve maintenance, overheating problems and size limitations of the scope encountered in present four-cycle engines. The engine 20 also avoids the loss of the fresh intake charge through the exhaust port that is generally prevalent in present two-cycle engines.

Figure 11:
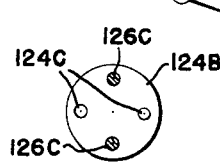
FIG. 11 is a sectional view of an inner piston of the engine of FIG. 10 taken along line 11—11 therein.

Referring now to FIG. 7 of the drawings, an internal combustion engine 120, which forms another embodiment of the present invention, includes a barrel or cylinder 122 having four pistons 124A, 124B, 126A and 126B movably mounted therein. The pistons 124A and 124B are interconnected by a plurality of rods 124C, and the pistons 126A and 126B are interconnected by a plurality of rods 126C. The rods 124C pass through suitable apertures in the piston 126A, and the rods 126C pass through suitable apertures in the piston 124B, as shown in FIG. 11. Thus, the pistons 124A and 124B move together as a pair independently of the pistons 126A and 126B which also move together as a pair. The barrel 122 is thus divided by the pistons into three sections designated as A, B and C. The sections A and B are working chambers in the combustion engine 120 while the section C is used only for lubrication or other purposes and is vented externally of the barrel 122 by a plurality of vents 122A to keep the pressure in this section substantially at that of the atmosphere at all times.

The barrel 122 is provided with a pair of removable end stops 128A and 128B which limit the outward travel of the outer pistons 124A and 126B. A pair of intake ports 132A and 132B in the wall of the barrel 122 communicate with an intake system 134 in order to supply fresh charges into the chambers A and B. A pair of exhaust ports 136A and 136B in the wall of the barrel 122 communicate with an exhaust system 138 to allow exhaust products to be expelled from the chambers A and B.

The inner edges of ports 132A and 136A are positioned adjacent the left face of piston 126A when it is in its innermost position in the barrel 122, and the inner edges of ports 132B and 136B are positioned adjacent the right face of piston 124B when it is in its innermost position in the barrel 122. It is preferable that the respective exhaust ports 136A and 136B and intake ports 132A and 132B be positioned diametrically opposite each other in the wall of the barrel 122. However, they can be disposed at various positions around the wall of the barrel 122 for convenience or necessity in order to eliminate interference with other engine parts.

A crankshaft 140 having a flywheel 197 mounted thereon is rotatably mounted with its axis offset from and perpendicular to the axis of the barrel 122. A pair of extensible connecting rods 142A and 142B, similar in construction to the extensible connecting rod 42, previously described and shown in FIG. 6, are pivotally connected to a crank pin 146 on the crankshaft 140. The outer ends of the connecting rods 142A and 142B are pivotally connected to the end of a pair of rocker arms 174A and 174B. These rocker arms are pivotally supported on a pair of brackets 176A and 176B that extend from the end stops 128A and 128B. The other ends of these rocker arms are pivotally connected to the outer ends of a pair of piston link rods 182A and 182B, the other ends of which are pivotally connected to wrist pins 144A and 144B mounted on the outer faces of the pistons 124A and 126B. Thus, the above-described linkages interconnect the pair of pistons 124A and 124B with the crankshaft 140 and the pair of pistons 126A and 126B with the crankshaft 140.

The operation of the engine 120 is similar to the operation of the engine 20 except that by the use of the pairs of nested pistons, two active combustion chambers A and B are provided in a single barrel 122. This results in the engine 120 having a very high power output per unit engine weight or size.

FIGS. 7–10 of the drawings illustrate the engine 120 in its different successive positions during a single revolution of the crankshaft. In FIG. 7, the chamber A has just completed the exhaust phase, and the chamber B has just completed the compression phase. In this condition, the pistons 124A, 124B, 126A and 126B are all at their farthest right position in the barrel 122 with the piston 126B resting against the end stop 128B. The crank pin 146 is in its farthest left position with extensible connecting rod 142A being shortened to its minimum length and the rod 142B being extended to its maximum length.

When ignition and combustion take place in the chamber B, the piston 126B is forced against the end stop 128B so that this piston and its connected piston 126A remain stationary. The piston 124B and its connected piston 124A are moved to the left due to the combustion pressure on the right-hand face of the piston 124B. This movement of the pistons 124A and 124B rotates the crankshaft 140 clockwise to the position shown in FIG. 8 and causes the induction of a fresh charge into the chamber A through the intake port 132A. As piston 124B passes the exhaust port 136B, the combustion products in cylinder B are exhausted through the exhaust port 136B. The connecting rod 142A remains at its minimum length during this time, and the rod 142B contracts from its maximum length to its minimum length. Thus, the intake phase of the chamber A and the power phase of the chamber B are completed during this interval.

Figure 8:
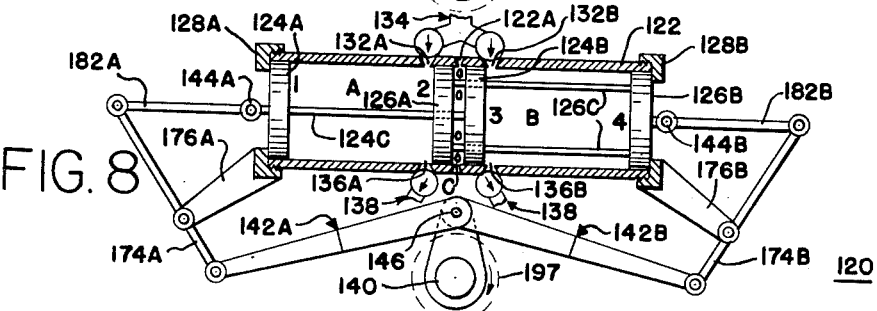
FIG. 8 is a sectional view of the engine of FIG. 7 showing the crank assembly after 90° of clockwise rotation from its position in FIG. 7.
Figure 9:
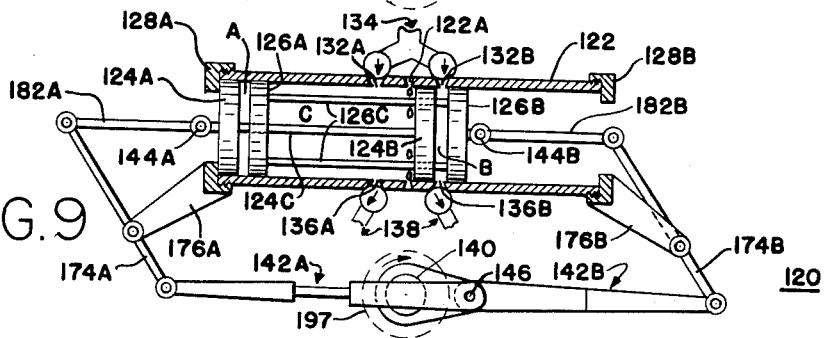
FIG. 9 is a sectional view of the engine of FIG. 7 showing the crank assembly after 90° of rotation from the position in FIG. 8 in a right dead-center position.

The inertia of the flywheel 197 rotates the crankshaft 140 from the position shown in FIG. 8 to the position shown in FIG. 9. During this period, the interconnected pistons 124A and 124B remain stationary at their farthest left position within the barrel 122 with the piston 124A resting against the end stop 128A. The pair of interconnecting pistons 126A and 126B are moved leftward to compress the charge in cylinder A with ignition occurring slightly before the end of the stroke to start the combustion process. The exhaust products remaining in the cylinder B are expelled through the exhaust port 136B by the leftward movement of piston 126B. The extensible connecting rod 142B remains at its minimum length during this movement, and the rod 142A extends from its minimum to maximum length during this time because the piston 124A is held stationary against the end stop 128A by the pressure in the chamber A. Thus, during this interval the compression phase of the chamber A and the exhaust phase of the chamber B are accomplished.

The initiation of combustion in the chamber A, described above, holds the pair of interconnected pistons 124A and 124B stationary because the piston 124A is forced against the end stop 128A. The combustion pressure acts on the left-hand face of the piston 126A to move the pair of interconnected pistons 126A and 126B to the right. This movement rotates the crankshaft 140 in a clockwise direction to the position shown in FIG. 10. The movement of the piston 126B inducts a fresh fuel charge into the cylinder B through the intake port 132B. As the piston 126A passes the exhaust port 136A, the products of combustion in the cylinder A are exhausted through this exhaust port. The extensible connecting rod 142A is contracted during this movement from its maximum to minimum length, and the rod 142B remains at its minimum length. Thus, the power phase of the cylinder A and the intake phase of the cylinder B are accomplished during this interval.

Figure 10:
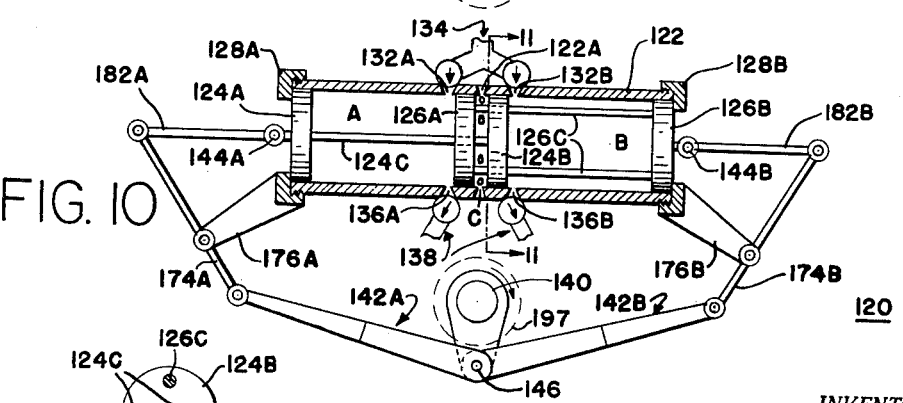
FIG. 10 is a sectional view of the engine of FIG. 7 showing the crank assembly after 90° of clockwise rotation from the position in FIG. 9.

As the inertia of the flywheel 197 rotates the crankshaft 140 clockwise from the position shown in FIG. 10 to the position shown in FIG. 7, the interconnected pistons 126A and 126B remain stationary at their farthest right position with piston 126B resting against the end stop 128B. The pair of interconnected pistons 124A and 124B are moved to the right so that the piston 124B compresses the charge in chamber B. The exhaust products remaining in the chamber A are expelled through the exhaust port 136A by the movement of the piston 124A. The extensible connecting rod 142A remains at its minimum length during this time, and the rod 142B is extended from its minimum length to its maximum length. Thus, the exhaust phase is accomplished in the chamber A and the compression phase is carried out in the chamber B. The engine is now ready to repeat the cycle of operation shown in FIGS. 7–10.

From the foregoing description, it can be seen that the engine 120 is operated through two power phases, one in each of the chambers A and B, during a single revolution of the crankshaft 140. Thus, the engine 120 produces a relatively steady power flow and has a very high power output per unit engine weight and space.

An internal combustion engine 220 forming another embodiment of the present invention is illustrated in FIG. 12 of the drawings. The engine 220 includes a cylinder or barrel 222 having four pistons 224A, 224B, 226A and 226B movably mounted therein. The pistons 224A and 224B are interconnected by a plurality of rods 224C, and the pistons 226A and 226B are interconnected by a plurality of rods 226C. The rods 224C pass through suitable apertures in the piston 226A, and the rods 226C pass through suitable apertures in the piston 224B. Thus, the pistons 224A and 224B move together as a pair independently of the pistons 226A and 226B which move together as a pair. The barrel 222 is thus divided into three sections designated as $A_1$, $B_1$ and $C_1$. The sections $A_1$ and $B_1$ are working chambers in the combustion engine 220, while the section $C_1$ is used only for lubrication or other purposes and is vented externally of the barrel 222 by a plurality of vents 222A to keep the pressure in this section substantially at that of the atmosphere at all times.

The barrel 222 is provided with a pair of intake ports 232A and 232B which communicate with an intake system 234 in order to supply fresh intake or fuel charges into the chambers $A_1$ and $B_1$. A pair of exhaust ports 236A and 236B communicate with an exhaust system 238 to allow exhaust products to be expelled from the chambers $A_1$ and $B_1$. The inner edges of the ports 232A and 236A are positioned adjacent the left face of of the piston 226A when it is in its innermost position in the barrel 222, and the inner edges of ports 232B and 236B are positioned adjacent the right face or piston 224B when it is in its innermost position in the cylinder 222. It is preferable that the respective intake ports 232A and 232B and exhaust ports 236A and 236B be positioned diametrically opposite each other in the wall of barrel 222. However, they can be disposed at various positions around the wall of barrel 222 for convenience or necessity in order to eliminate interference with other engine parts.

A pair of crankcases 228A and 228B are provided at both ends of barrel 222. These crankcases serve as end stops for limiting the leftward travel of piston 224A and the rightward travel of piston 226B, respectively, as well as providing bearing supports for a pair of crankshafts 240A and 240B, respectively. The axes of the crankshafts 240A and 240B are perpendicular to the longitudinal axis of the barrel 222, and a pair of flywheels 297A and 297B are carried on one end of the crankshafts 240A and 240B, respectively. The crankshaft 240A rotates in an opposite direction to that of the crankshaft 240B, and the crankshaft 240A is provided with an eccentric crank pin 246A that is 180° out of phase with an eccentric crank pin 246B carried by the crankshaft 240B.

The ends of the crankshafts 240A and 240B opposite the ends of which flywheels 297A and 297B are mounted are provided with a pair of bevel gears 294A and 294B, respectively. The gears 294A and 294B engage a pair of bevel gears 295A and 295B, respectively, which are mounted on a shaft 296 that has an axis of rotation extending perpendicular to and intersecting the axes of the crankshafts 240A and 240B. In this manner, the rotative power of the crankshafts 240A and 240B is delivered to a common shaft 296, and the proper phase relationship between the crankshafts 240A and 240B is maintained.

A pair of extensible connecting rods 242A and 242B, similar in construction to the connecting rod 42, shown in FIG. 6, are pivotally connected at one end to the crank pins 246A and 246B, respectively. The other ends of connecting rods 242A and 242B are pivotally connected to a pair of wrist pins 244A and 244B mounted on the outer faces of the pistons 224A and 226B, respectively.

Thus, the pistons 224A and 224B are interconnected with the crankshaft 240A, the pistons 226A and 226B are interconnected with the crankshaft 240B, and the crankshafts 240A and 240B are interconnected with the common shaft 296 from which the power output developed by the engine 220 is available.

The operation of the engine 220 is somewhat similar to the operation of the engine 120 described above, with combustion taking place in the chamber $A_1$ when both pairs of pistons are in their farthest left position within the cylinder 222. The combustion pressure forces the piston 224A against the stop portion of crankcase 228A and causes the piston 226A to move to the right, thus rotating the crankshaft 240B 90° in a clockwise direction from the point at which the crank pin 246B is in its farthest left position. The crankshaft 240A is rotated 90° in a counterclockwise direction from a point at which the crank pin 246A is in its farthest left position because of the interconnection between the two crankshafts. The piston 226B, moving rightward, draws an intake charge into the chamber $B_1$ through the intake port 232B, and as the piston 226A passes the exhaust port 236A on its rightward movement, products of combustion within the chamber $A_1$ begin to exhaust out through the exhaust port 236A. During this interval, the connecting rod 242A contracts from its maximum to its minimum length while the connecting rod 242B remains at its minimum length.

The flywheels 297A and 297B cause the crankshafts 240A and 240B to rotate through the next 90° of rotation, with crankshaft 240A rotating counterclockwise to a point at which the crank pin 246A is in its farthest right position, and the crankshaft 240B rotating clockwise to a point at which the crank pin 246B is in its farthest right position. This causes the pistons 224A and 224B to move rightward forcing the exhaust products of combustion in the chamber $A_1$ out through the exhaust port 236A and compressing the intake charge in the chamber $B_1$. The pistons 226A and 226B remain stationary during this time with piston 226B forced against the stop portion of the crankcase 228B by the compression pressure in the chamber $B_1$. During this interval, the connecting rod 242A remains at its minimum length and the connecting rod 242B is extended from its minimum to its maximum length.

Combustion now takes place in the chamber $B_1$ with ignition occurring slightly before maximum compression is reached. The combustion pressure forces the piston 226B against the stop portion of the crankcase 228B and causes the piston 224B to move leftward, thus rotating the crankshaft 240A 90° in counterclockwise direction from the point at which the crank pin 246A is in its farthest right position. The crankshaft 240B is rotated 90° in a clockwise direction from a point at which the crank pin 246B is in its farthest right position because of the interconnection of the two crankshafts. The piston 224A, moving leftward, draws an intake charge into the chamber $A_1$ through the intake port 232A and as the piston 224B on its leftward movement passes the exhaust port 236B, the products of combustion in the chamber $B_1$ begin to exhaust out through the exhaust port 236B.

The flywheels 297A and 297B cause the crankshafts 240A and 240B to rotate through the final 90° of rotation, with the crankshaft 240A rotating counterclockwise to a point at which the crank pin 246A is in its farthest left position, and the crankshaft 240B rotating clockwise to a point at which the crank pin 246B is in its farthest left position. This causes the pistons 226A and 226B to move leftward, forcing the remaining exhaust products in the chamber $B_1$ out through the exhaust port 236B and compressing the intake charge in the chamber $A_1$. The pistons 224A and 224B remain stationary during this time with the piston 224A forced against the stop portion of the crankcase 228A by the compression pressure in the chamber $A_1$. During this interval, the connecting rod 242A is extended from its minimum to its maximum length and the connecting rod 242B remains at its minimum length. The engine 220 is now ready to repeat the operations outlined above.

It is apparent from the foregoing discussion that a complete cycle of operation is accomplished in both chambers $A_1$ and $B_1$ during a single revolution of the crankshafts 240A and 240B. Both crankshafts 240A and 240B are engaged to rotate the common shaft 296 and, thus, the engine 220 provides two power impulses during each revolution of the shaft 296, resulting in the engine 220 having substantially the same characteristics and advantages as the engine 120.

Although the present invention has been described with reference to the plurality of illustrated embodiments thereof, it should be understood that many other modifications and embodiments can be devised by those skilled in the art that will fall within the spirit and scope of the principles of this invention.

What is claimed as new and desired to be secured by Letters Patent of the United States is:

1. An internal combustion engine comprising a cylinder, a pair of piston means movably mounted in said cylinder, inlet means in communication with said cylinder at a position between said pair of piston means for supplying an intake charge to said cylinder, outlet means in communication with said cylinder between said pair of piston means for exhausting combustion products from said cylinder, a rotatably mounted crankshaft, a first means interconnecting said crankshaft and a first one of said piston means, rotation of said crankshaft being operable to move said first piston means in one direction during a compression phase and said crankshaft being rotatable by movement of said first piston means in an opposite direction during a power phase, second means connected to a second one of said piston means associated with said crankshaft and operable in synchronism with said first means for moving said second piston means in said one direction to draw an intake charge into said cylinder through said inlet means during an intake phase and for moving said second piston means in said opposite direction during an exhaust phase to expel combustion products through said outlet means, first stop means for preventing movement of said first piston means during said intake and exhaust phases, and second stop means for preventing movement of said second piston means during said compression and power phases.

2. The internal combustion engine set forth in claim 1 wherein said first means includes a connecting element of variable length.

3. The internal combustion engine set forth in claim 1 in which said second means includes both cam means and means driven by said crankshaft for driving said cam means.

4. The internal combustion engine set forth in claim 1 wherein both said first and second means include a connecting element of variable length connected to said pistons.

5. The internal combustion engine set forth in claim 1 above wherein said second means includes a crankshaft geared to the first mentioned crankshaft and said first and said second means each include a connecting element of variable length interconnecting the respective ones of said crankshafts and pistons.

6. An internal combustion engine comprising a cylinder, at least one pair of pistons movably mounted in said cylinder, inlet means in communication with said cylinder for supplying an intake charge to said cylinder, outlet means in communication with said cylinder for exhausting combustion products from said cylinder, a crankshaft, extensible means interconnecting said crankshaft and a first one of said pistons, rotation of said crankshaft being operable to move said first piston in one direction during a compression phase and said crankshaft being rotatable by movement of said first piston in an opposite direction during a power phase, means connected to a second one of said pistons and driven in synchronism with said crankshaft for moving said second piston in said one direction to draw an intake charge into said cylinder through said inlet means during an intake phase and for moving said second piston in said opposite direction during an exhaust phase to expel combustion products through said outlet means, said first piston remaining stationary during said intake and exhaust phases and second piston remaining stationary during said compression and power phases.

7. An internal combustion engine comprising a cylinder, a first piston, a second piston, a third piston, a fourth piston, said pistons being movably mounted in said cylinder, means rigidly interconnecting said first and said third pistons and passing through said second piston, means rigidly interconnecting said second and said fourth pistons and passing through said third piston, a first combustion chamber being formed between said first and second pistons and a second combustion chamber being formed between said third and fourth pistons, inlet means communicating with each of said chambers for supplying intake charges to said cylinder, outlet means communicating with each of said chambers for exhausting combustion products from said cylinder, a crankshaft, first extensible means interconnecting said crankshaft and said first piston, rotation of said crankshaft being operable to move said first and third pistons in one direction causing a compression phase in said second chamber and an exhaust phase in said first chamber, said crankshaft being rotatable by movement of said first and third pistons in an opposite direction during a power phase in said second chamber and an intake phase in said first chamber, second extensible means interconnecting said crankshaft and said fourth piston for moving said second and said fourth pistons in said opposite direction causing a compression phase in said first chamber and an exhaust phase in said second chamber, said crankshaft being rotatable by movement of said second and fourth pistons in said one direction during a power phase in said first chamber and an intake phase in said second chamber, said first and third pistons remaining stationary during said compression and power phases in said first chamber and said second and fourth pistons remaining stationary during said compression and power phases in said second chamber.

8. An internal combustion engine comprising a cylinder, a first piston movably mounted in said cylinder, a second piston movably mounted in said cylinder, an inlet port in said cylinder at a position between said pair of pistons for supplying an intake charge to said cylinder, outlet means in communication with said cylinder between said pair of pistons for exhausting combustion products from said cylinder, a rotatably mounted crankshaft, an extensible connecting member interconnecting said crankshaft and said first piston, rotation of said crankshaft being effective to move said first piston in one direction toward said second piston during a compression phase and said crankshaft being driven by movement of said first piston in an opposite direction away from said second piston during a power phase, stop means for preventing movement of said first piston during an intake and an exhaust phase, and cam means driven by said crankshaft for moving said second piston in said one direction away from said first piston to draw an intake charge into said cylinder through said inlet port during an intake phase and for moving said second piston in said opposite direction toward said first piston during an exhaust phase to expel combustion products through said outlet port.

9. An internal combustion engine as set forth in claim 8 above wherein said cam means moves said second piston through a stroke of a different length than the length of the stroke of said first piston.

10. An internal combustion engine comprising a cylinder, a first piston means movably mounted in said cylinder, a crankshaft means, an extensible connecting member including a female member pivotally connected to one of said means and a male member pivotally connected to the other of said means, said male member being slidably received in said female member, resilient means biasing said male and female members toward each other, stop means for limiting the relative movement of said members toward each other, said connecting member being effective to drivingly interconnect said first piston means and said crankshaft means during substantially a first half of a revolution of said crankshaft means and drivingly disconnecting said first piston means and said crankshaft means during a second half of a revolution of said crankshaft means, a second piston means in said cylinder, and means drivingly interconnecting said second piston means and said crankshaft means during said second half of a revolution of said crankshaft means and drivingly disconnecting said second piston and said crankshaft means during said first half of a revolution of said crankshaft means.

11. An internal combustion engine comprising a cylinder, a rotating shaft, a plurality of pistons including a first piston, a second piston, a third piston and a fourth piston, and means operatively connecting said pistons to said shaft for alternately moving pairs of said pistons relative to said cylinder during separate and distinct portions of a single cycle of rotation of said shaft including both a first plurality of rods rigidly interconnecting said first and third pistons and passing through apertures in said second piston and a second plurality of rods rigidly interconnecting said second and fourth pistons and passing through apertures in said third piston.

12. The internal combustion engine set forth in claim 1 above in which said second means includes cam means driven by said crankshaft.

13. An internal combustion engine including in combination, a cylinder, a pair of pistons movably mounted in said cylinder, a rotating shaft, means interconnecting said pistons and said shaft including a mechanism for moving one of said pistons relative to the other through a stroke of a given length while the other of said pistons is substantially stationary and for moving said other piston relative to said one piston through a stroke of different length than said given length while said one piston is substantially stationary.

14. An internal combustion engine comprising, a cylinder, a pair of pistons movably mounted in said cylinder, a rotating shaft, first means operatively connecting one of said pistons to said shaft for moving said one piston during one portion of a single cycle of rotation of said shaft and for holding said one piston stationary during another portion of said cycle of rotation of said shaft, and second means including cam means rotated by said shaft and connected to the other of said pistons for moving said other piston toward and away from said one piston when said one piston is stationary.

15. An internal combustion engine comprising, a cylinder, a main piston and a valve piston movably mounted in said cylinder, a rotating shaft, first means interconecting said main piston and said shaft for moving said main piston toward said valve piston, means engaged with said first means for moving said valve piston toward and away from said main piston and for holding said valve piston stationary for one portion of a single cycle of rotation of said rotating shaft including a portion when said main piston is moved toward said valve piston, and stop means for holding said main piston stationary during another separate and distinct portion of said cycle including the portion when said valve piston is moving away from said main piston.

References Cited in the file of this patent

UNITED STATES PATENTS

| | | | |
|---|---|---|---|
| 821,370 | Morrison | | May 22, 1906 |
| 1,106,043 | Hallett | | Aug. 4, 1914 |
| 1,744,117 | Held | | Jan. 21, 1930 |
| 1,788,140 | Woolson | | Jan. 6, 1931 |
| 2,106,099 | Jenkins | | Jan. 18, 1938 |
| 2,118,153 | Buchwalder | | May 24, 1938 |
| 2,179,185 | Jerrell et al. | | Nov. 7, 1939 |